US012422764B2

(12) United States Patent
Yoshizawa et al.

(10) Patent No.: US 12,422,764 B2
(45) Date of Patent: Sep. 23, 2025

(54) TONER CONTAINER AND IMAGE FORMING APPARATUS

(71) Applicants: Hideo Yoshizawa, Kanagawa (JP); Kei Saito, Tokyo (JP); Yuki Oshikawa, Kanagawa (JP)

(72) Inventors: Hideo Yoshizawa, Kanagawa (JP); Kei Saito, Tokyo (JP); Yuki Oshikawa, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 91 days.

(21) Appl. No.: 18/277,582

(22) PCT Filed: Mar. 4, 2022

(86) PCT No.: PCT/IB2022/051909
§ 371 (c)(1),
(2) Date: Aug. 17, 2023

(87) PCT Pub. No.: WO2022/200884
PCT Pub. Date: Sep. 29, 2022

(65) Prior Publication Data

US 2024/0134301 A1 Apr. 25, 2024
US 2024/0231257 A9 Jul. 11, 2024

(30) Foreign Application Priority Data

Mar. 25, 2021 (JP) ................................. 2021-051225
Jan. 24, 2022 (JP) ................................. 2022-008391

(51) Int. Cl.
*G03G 15/08* (2006.01)

(52) U.S. Cl.
CPC ..... *G03G 15/0872* (2013.01); *G03G 15/0886* (2013.01); *G03G 2215/0668* (2013.01);
(Continued)

(58) Field of Classification Search
None
See application file for complete search history.

(56) References Cited

U.S. PATENT DOCUMENTS 4,878,603 A * 11/1989 Ikesue ................ G03G 15/0868
222/DIG. 1
6,314,261 B1 * 11/2001 Omata ............... G03G 15/0872
222/DIG. 1
(Continued)

FOREIGN PATENT DOCUMENTS

EP 1357441 A1 10/2003
JP 2005-165130 A 6/2005
(Continued)

OTHER PUBLICATIONS

International Search Report and Written Opinion issued on May 30, 2022 in PCT/IB2020/051909 filed on Mar. 4, 2022, 10 pages.

*Primary Examiner* — Sevan A Aydin
(74) *Attorney, Agent, or Firm* — XSENSUS LLP

(57) ABSTRACT

A toner container (32) includes a rotatable container body (33). The container body includes an opening portion (33*c*) and a plurality of projections (33*a*). The opening portion is on a first end, which is opposite a second end, of the container body in a rotation axis direction. The plurality of projections are each protrude inward and have a slope inclined with respect to the rotation axis direction. The plurality of projections are disposed such that, out of two adjacent projections in the rotation axis direction, one projection closer to the first end of the container body in the rotation axis direction overlaps the other projection closer to the second end of the container body in the rotation axis direction, in an area of the one projection closer to the second end and an area of the other projection closer to the first end in the rotation axis direction.

19 Claims, 6 Drawing Sheets

(52) U.S. Cl.
CPC ............... *G03G 2215/0678* (2013.01); *G03G 2215/0692* (2013.01)

(56) References Cited

U.S. PATENT DOCUMENTS

| | | | | |
|---|---|---|---|---|
| 2004/0234297 | A1* | 11/2004 | Yoshikawa ........ | G03G 15/0865 399/258 |
| 2005/0053399 | A1* | 3/2005 | Okino .................. | G03G 15/081 399/260 |
| 2006/0147228 | A1* | 7/2006 | Nagahama ......... | G03G 15/0872 399/262 |
| 2009/0129813 | A1* | 5/2009 | Nagashima ........ | G03G 15/0887 399/119 |
| 2010/0272477 | A1* | 10/2010 | Nishikawa ......... | G03G 15/0886 399/262 |
| 2011/0243579 | A1 | 10/2011 | Oshikawa et al. | |
| 2011/0305485 | A1 | 12/2011 | Oshikawa et al. | |
| 2014/0029973 | A1 | 1/2014 | Terazawa et al. | |
| 2014/0248060 | A1 | 9/2014 | Oshikawa et al. | |
| 2014/0270859 | A1 | 9/2014 | Hosokawa et al. | |
| 2015/0346634 | A1 | 12/2015 | Ohgoshi | |
| 2020/0183303 | A1 | 6/2020 | Kikuchi et al. | |
| 2020/0292963 | A1 | 9/2020 | Adachi et al. | |
| 2021/0003942 | A1 | 1/2021 | Kikuchi et al. | |
| 2021/0088935 | A1 | 3/2021 | Kikuchi et al. | |
| 2022/0088950 | A1 | 3/2022 | Oshikawa | |

FOREIGN PATENT DOCUMENTS

| | | | |
|---|---|---|---|
| JP | 2014-112120 | A | 6/2014 |
| JP | 2022-052243 | A | 4/2022 |

* cited by examiner

TONER CONTAINER AND IMAGE FORMING APPARATUS

CROSS-REFERENCE TO RELATED APPLICATIONS

This application is based on PCT filing PCT/IB2022/051909, filed on Mar. 4, 2022, which claims priority to Japanese Patent Application Nos. 2021-051225, filed on Mar. 25, 2021, and 2022-008391, filed on Jan. 24, 2022, in the Japan Patent Office, the entire disclosure of each of which is hereby incorporated by reference herein.

TECHNICAL FIELD

Embodiments of the present disclosure relate to a toner container to store toner and an image forming apparatus incorporating the same.

BACKGROUND ART

Conventionally, as an example of an image forming apparatus such as a copier, a printer, a facsimile machine, and multifunction peripherals (MFPs) including at least two of the copier, the printer, and the facsimile machine, an image forming apparatus is widely known in which a cylindrical toner container (i.e., a powder container) is detachably attached (e.g., see PTL 1).

Specifically, a toner container disclosed in PTL 1 has a spiral groove formed on a circumferential surface of a rotatable container body. When the container body is driven to rotate in a state in which the toner container is installed in a body of an image forming apparatus, toner contained in the container body is conveyed in a rotation axis direction along the spiral groove and is discharged from an opening portion to the outside of the toner container.

CITATION LIST

Patent Literature

[PTL 1]
Japanese Unexamined Patent Application Publication No. 2014-112120

SUMMARY OF INVENTION

Technical Problem

A conventional toner container is provided with a spiral groove (projection) on a circumferential surface of a container body, so that the internal volume of the container body is reduced by the volume of the groove, and the storable toner capacity is reduced. In order to solve such a problem, a groove (projection) formed on the circumferential surface of the container body may be divided in the rotation axis direction to reduce the proportion of the groove in the container body within a range that does not affect the toner conveyance performance. In this case, the toner tends to accumulate between adjacent grooves (projections). A problem that the amount of toner remaining in the toner container at a toner end state increases may occur.

The present disclosure is made to solve the above-described problem, and an object of the present disclosure is to provide a toner container and an image forming apparatus that can prevent an increase in the amount of toner remaining in the toner container at the toner end state, without decreasing the amount of toner that can be stored in the toner container.

Solution to Problem

A toner container according to an embodiment of the present disclosure includes a rotatable container body. The container body includes an opening portion and a plurality of projections. The opening portion is on a first end, which is opposite a second end, of the container body in a rotation axis direction. The plurality of projections are each protrude inward and have a slope inclined with respect to the rotation axis direction. The plurality of projections are disposed such that, out of two adjacent projections in the rotation axis direction, one projection closer to the first end of the container body in the rotation axis direction overlaps the other projection closer to the second end of the container body in the rotation axis direction, in an area of the one projection closer to the second end and an area of the other projection closer to the first end in the rotation axis direction.

Advantageous Effects of Invention

An advantage of some embodiments of the disclosure is to provide a toner container and an image forming apparatus that can prevent an increase in the amount of toner remaining in the toner container at the toner end state, without decreasing the amount of toner that can be stored in the toner container.

BRIEF DESCRIPTION OF DRAWINGS

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF EMBODIMENTS

Figure 1:
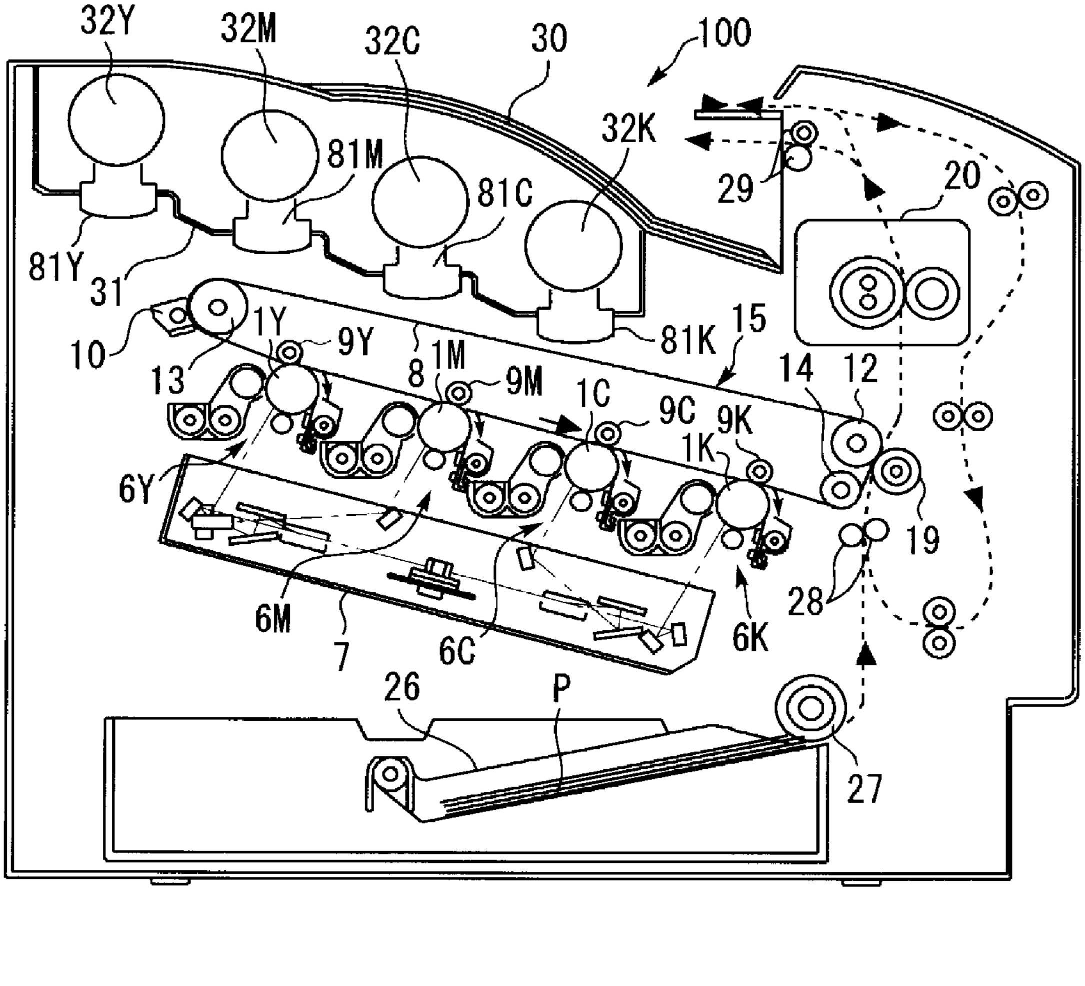
FIG. 1 is a schematic diagram illustrating an overall configuration of an image forming apparatus according to an embodiment of the present disclosure.

The terminology used herein is for the purpose of describing particular embodiments only and is not intended to be limiting of the present invention. As used herein, the singular forms "a," "an," and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Embodiments of the present disclosure are described below with reference to drawings. Note that identical reference numerals are assigned to identical or equivalent components and a description of those components may be simplified or omitted.

Figure 2:
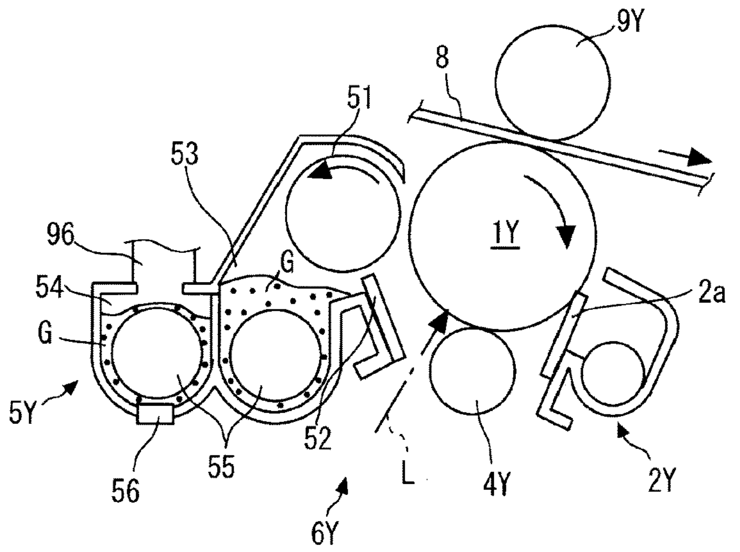
FIG. 2 is a cross-sectional view of an image forming device of the image forming apparatus in FIG. 1.
Figure 3:
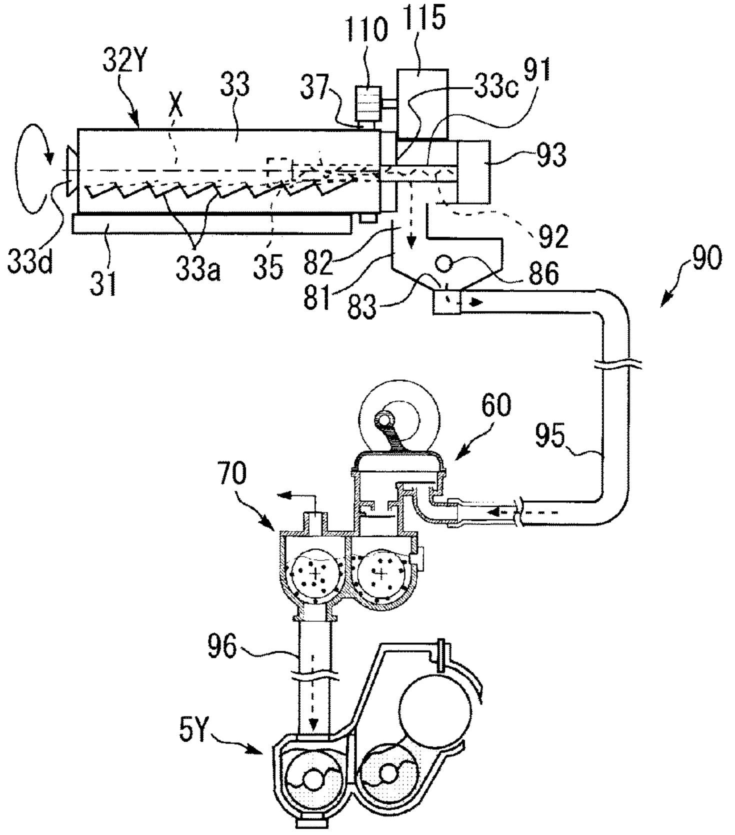
FIG. 3 is a schematic view of a toner supply device of the image forming apparatus and the vicinity thereof.

With reference to FIGS. 1 to 3, a configuration and operation of an image forming apparatus 100 are described below. FIG. 1 is a schematic view illustrating a configuration of a printer as the image forming apparatus. FIG. 2 is an enlarged schematic view of an image forming device of the image forming apparatus. FIG. 3 is a schematic view illustrating a configuration of a toner supply device and the vicinity thereof. As illustrated in FIG. 1, an image forming apparatus 100 includes an installation section 31 (serving as a toner container rack) in an upper portion of a body thereof. Substantially cylindrical toner containers 32Y, 32M, 32C, and 32K are detachably (replaceably) attached to the installation section 31. The four toner containers 32Y, 32M, 32C, and 32K correspond to four colors, that is, yellow, magenta, cyan, and black, respectively. Below the toner containers 32Y, 32M, 32C, and 32K, hoppers 81Y, 81M, 81C, and 81K of toner supply devices are disposed, respectively. An intermediate transfer unit 15 is disposed below the installation section 31. Image forming devices 6Y, 6M, 6C, and 6K are arranged side by side, facing an intermediate transfer belt 8 of the intermediate transfer unit 15 to form toner images of yellow, magenta, cyan, and black, respectively.

With reference to FIG. 2, the image forming device 6Y for yellow includes a photoconductor drum 1Y (serving as an image bearer), a charging device 4Y, a developing device 5Y, a cleaning device 2Y, and a discharging device that are disposed around the photoconductor drum 1Y. Image forming processes (i.e., charging, exposure, development, transfer, cleaning, and discharging processes) are performed on the photoconductor drum 1Y, and thus a yellow toner image is formed on the surface of the photoconductor drum 1Y.

The other three image forming devices 6M, 6C, and 6K have a similar configuration to that of the image forming device 6Y for yellow except for the color of toner used therein and form magenta, cyan, and black toner images, respectively. Therefore, only the image forming device 6Y for yellow is described below and descriptions of the other three image forming devices 6M, 6C, and 6K are omitted to avoid redundancy.

With reference to FIG. 2, the photoconductor drum 1Y is driven by a motor to rotate clockwise in FIG. 2. The charging device 4Y uniformly charges the surface of the photoconductor drum 1Y (a charging process). When the surface of the photoconductor drum 1Y reaches a position at which the surface of the photoconductor drum 1Y is irradiated with laser beam L emitted from an exposure device 7 (serving as a writing device, see FIG. 1), the photoconductor drum 1Y is scanned with the laser beam L. Thus, an electrostatic latent image corresponding to yellow is formed on the photoconductor drum 1Y (an exposure process).

When the surface of the photoconductor drum 1Y reaches a position facing the developing device 5Y, the electrostatic latent image is developed with toner into a yellow toner image (a development process). When the surface of the photoconductor drum 1Y bearing the toner image reaches a position facing a primary transfer roller 9Y via the intermediate transfer belt 8, the toner image on the photoconductor drum 1Y is transferred onto the intermediate transfer belt 8 (a primary transfer process). After the primary transfer process, a slight amount of untransferred toner remains on the photoconductor drum 1Y.

When the surface of the photoconductor drum 1Y reaches a position facing the cleaning device 2Y, a cleaning blade 2*a* collects the untransferred toner from the photoconductor drum 1Y into the cleaning device 2Y (a cleaning process). Finally, the surface of the photoconductor drum 1Y reaches a position facing the discharging device, and the discharging device removes residual potentials from the photoconductor drum 1Y. Thus, a series of image forming processes performed on the surface of the photoconductor drum 1Y is completed.

Note that the other image forming devices 6M, 6C, and 6K perform the series of image forming processes described above in substantially the same manner as the image forming device 6Y. That is, the exposure device 7 disposed below the image forming devices 6M, 6C, and 6K irradiates photoconductor drums 1M, 1C, and 1K of the image forming devices 6M, 6C, and 6K, respectively, with the laser beams L based on image data. Specifically, in the exposure device 7, a light source emits the laser beam L, which is deflected by a polygon mirror rotated. The laser beam L then reaches the photoconductor drum 1 via multiple optical elements. Thus, the exposure device 7 scans the surface of each of the photoconductor drums 1M, 1C, and 1K with the laser beam L. Then, toner images formed on the photoconductor drums 1Y, 1M, 1C, and 1K through the development process are transferred and superimposed onto the intermediate transfer belt 8. Thus, a color toner image is formed on the intermediate transfer belt 8.

The intermediate transfer unit 15 includes the intermediate transfer belt 8, four primary transfer rollers 9Y, 9M, 9C, and 9K, a secondary transfer counter roller 12, a cleaning backup roller 13, a tension roller 14, and an intermediate transfer cleaning device 10. The intermediate transfer belt 8 is extended and supported by the secondary transfer counter roller 12, the cleaning backup roller 13, and the tension roller 14. The secondary transfer counter roller 12 serves as a driving roller to rotate the intermediate transfer belt 8 in the direction (counterclockwise) indicated by arrow in FIG. 1.

Each of the four primary transfer rollers 9Y, 9M, 9C, and 9K nip the intermediate transfer belt 8 with the corresponding one of the photoconductor drums 1Y, 1M, 1C, and 1K to form an area of contact, herein called a primary transfer nip, between the intermediate transfer belt 8 and the corresponding one of the photoconductor drums 1Y, 1M, 1C, and 1K.

A primary-transfer bias opposite in polarity to toner is applied to the primary transfer rollers 9Y, 9M, 9C, and 9K. The intermediate transfer belt 8 travels in the direction (counterclockwise) indicated by arrow in FIG. 1 and sequentially passes through the primary transfer nips of the primary transfer rollers 9Y, 9M, 9C, and 9K. Then, the single color toner images on the photoconductor drums 1Y, 1M, 1C, and 1K are primarily transferred to and superimposed onto the intermediate transfer belt 8, thereby forming the multicolor toner image.

Subsequently, the intermediate transfer belt 8 bearing the multicolor toner image reaches a position opposite a secondary transfer roller 19. At this position, the intermediate transfer belt 8 is nipped between the secondary transfer counter roller 12 and the secondary transfer roller 19 to form a secondary transfer nip. The toner images of four colors formed on the intermediate transfer belt 8 are transferred onto a sheet P such as a sheet of paper conveyed to the position of the secondary transfer nip (a secondary transfer process). At this time, the untransferred toner may remain on the intermediate transfer belt 8 as a residual toner.

The surface of the intermediate transfer belt 8 then reaches a position opposite the intermediate transfer cleaning device 10. At the position, the intermediate transfer cleaning device 10 collects the untransferred toner from the intermediate transfer belt 8. Thus, a series of transfer processes performed on the intermediate transfer belt 8 is completed.

The sheet P is conveyed from a sheet feeder 26 disposed in a lower portion of the body of the image forming apparatus 100 to the secondary transfer nip via a feed roller 27 and a registration roller pair 28. Specifically, the sheet feeder 26 contains a stack of multiple sheets P such as sheets of paper stacked on one on another. As the feed roller 27 is rotated counterclockwise in FIG. 1, the feed roller 27 feeds a top sheet P from the stack in the sheet feeder 26 to a roller nip between the registration roller pair 28.

The sheet P conveyed to the registration roller pair 28 (serving as a timing roller pair) temporarily stops at the roller nip between the rollers of the registration roller pair 28 that stops rotating. Rotation of the registration roller pair 28 is timed to convey the sheet P toward the secondary transfer nip such that the sheet P meets the color toner image on the intermediate transfer belt 8 at the secondary transfer nip. Thus, the desired color toner image is transferred onto the sheet P.

Subsequently, the sheet P, onto which the multicolor toner image is transferred at the secondary transfer nip, is conveyed to a position of a fixing device 20. Then, at this position, the color toner image transferred to the surface of the sheet P is fixed on the sheet P by heat and pressure of the fixing roller and the pressure roller (a fixing process). Thereafter, the sheet P bearing the fixed toner image is conveyed through a roller nip formed by an output roller pair 29 and ejected by the output roller pair 29 onto an outside of the image forming apparatus 100. The sheets P ejected by the output roller pair 29 are sequentially stacked as output images on a stack tray 30. Thus, a series of image forming processes performed by the image forming apparatus 100 is completed.

Next, a detailed description is provided of a configuration and operations of the developing device 5Y of the image forming device 6Y with reference to FIG. 2. The developing device 5Y includes a developing roller 51, a doctor blade 52, two conveying screws 55, and a toner concentration sensor 56. The developing roller 51 faces the photoconductor drum 1Y. The doctor blade 52 faces the developing roller 51. The two conveying screws 55 are disposed within developer housings 53 and 54. The toner concentration sensor 56 detects a concentration of toner in developer G. The developing roller 51 includes magnets and a sleeve. The magnets are secured inside the developing roller 51. The sleeve rotates around the magnets. The developer housings 53 and 54 contain the two-component developer G including carrier (i.e., carrier particles) and toner (i.e., toner particles).

The developing device 5Y described above operates as follows. The sleeve of the developing roller 51 rotates in a direction (counterclockwise) indicated by arrow in FIG. 2. The developer G is borne on the developing roller 51 by a magnetic field generated by the magnets. As the sleeve rotates, the developer G moves along the circumference of the developing roller 51. The developer G in the developing device 5Y is adjusted so that the ratio of toner (i.e., toner concentration) in the developer G is within a predetermined range. Specifically, the toner supply device 90 (see FIG. 3) serving as a supply device that supplies toner from the toner container 32Y to the developer housing 54 (see FIG. 2) according to the toner consumption in the developing device 5Y.

The toner supplied to the developer housing 54 is stirred and mixed together with the developer G and circulated through the two developer housings 53 and 54 by the two conveying screws 55 (i.e., in a longitudinal direction perpendicular to the plane on which FIG. 2 is illustrated). The toner in the developer G is electrically charged by friction together with the carrier and thus is attracted to the carrier. Both the toner and the carrier are borne on the developing roller 51 due to a magnetic force generated on the developing roller 51. The developer G borne on the developing roller 51 is conveyed in the direction (counterclockwise) indicated by arrow in FIG. 3 and reaches a position opposite the doctor blade 52Y. The doctor blade 52 adjusts the amount of the developer borne on the developing roller 51 to an appropriate amount. Thereafter, the developer G on the developing roller 51 is conveyed to a position opposite the photoconductor drum 1Y (i.e., a developing area). The toner is attracted to the latent image formed on the photoconductor drum 1Y by an electric field generated in the developing area. Subsequently, as the sleeve rotates, the developer G remained on the developing roller 51 reaches an upper portion of the developer housing 53 and separates from the developing roller 51.

Next, with reference to FIG. 3, a configuration and operations of the toner supply device 90 are briefly described. The toner supply device 90 rotationally drives a container body 33 of the toner container 32Y (i.e., a powder container) disposed in the installation section 31 in a predetermined direction (i.e., in the direction indicated by arrow in FIG. 3), discharges the toner as a powder contained in the toner container 32Y to the outside of the toner container 32Y through an opening portion 33*c* (toner discharge port), and guides the toner to the developing device 5Y via a sub-hopper 70. The toner supply device 90 includes a toner supply path (i.e., a toner conveyance path). To easily understand the configuration of the toner supply device 90, the toner container 32Y, the toner supply device 90, and the developing device 5Y are illustrated in FIG. 3 in different orientations from the actual arrangement. Actually, the longitudinal axes of the toner container 32Y and a part of the toner supply device 90 are perpendicular to the plane on which FIG. 3 is illustrated (see FIG. 1). In addition, the orientations and arrangement of conveying tubes 95 and 96 are also illustrated in a simplified manner.

The toner supply devices 90 supply the color toners contained in the toner containers 32Y, 32M, 32C, and 32K installed in the installation section 31 in the body of the image forming apparatus 100 to the corresponding developing devices 5Y, 5M, 5C, and 5K, respectively. The amount of toner supplied to each developing device 5 is determined based on the amount of toner consumed in the corresponding developing device 5. The four toner supply devices 90 have a similar configuration except the color of the toner used in the image forming processes. Specifically, with reference to FIG. 3, when the toner container 32Y is attached to the installation section 31 of the body of the image forming apparatus 100, a toner conveying nozzle 91 of the body of the image forming apparatus 100 pushes and moves a shutter 35 of the toner container 32Y. As a result, the toner conveying nozzle 91 is inserted into the toner container 32Y (i.e., the container body 33) via the opening portion 33*c*. Accordingly, the toner contained in the toner container 32Y can be discharged through the toner conveying nozzle 91. The toner container 32Y includes a gripper 33*d* at the bottom (i.e., left side in FIG. 3) of the toner container 32Y so that a user easily handles and installs the toner container 32Y in the installation section 31. The gripper 33*d* has an outer radius smaller than an outer radius of the container body 33. The user grips the gripper 33*d* to install the toner container 32Y in the installation section 31 and take out the toner container 32Y from the installation section 31.

With reference to FIG. 3, the toner container 32Y includes the container body 33 having a plurality of projections 33*a* (groove portion) in the axial direction of the container body 33 (i.e., in the left and right direction in FIG. 3, and in the longitudinal direction of the container body 33). Specifically, the plurality of projections 33*a* is formed in a concave shape from an outer circumferential surface toward an inner circumferential surface of the container body 33 so that the rotation of the container body 33 conveys the toner in the container body 33 from the left to the right in FIG. 3. The toner conveyed from the left to the right in FIG. 3 inside the container body 33 is discharged to the outside of the toner container 32Y through the toner conveying nozzle 91. The toner container 32Y includes a gear 37 meshing with a drive gear 110 of the body of the image forming apparatus 100. The gear 37 is disposed on the outer circumferential surface of the head of the container body 33 (i.e., right of the container body 33 in FIG. 3, and on a first end in a rotation axis direction of the container body 33). When the toner container 32Y is installed to the installation section 31, the gear 37 of the container body 33 meshes with the drive gear 110 of the body of the image forming apparatus 100. As a drive motor 115 is driven, a driving force is transmitted from the drive gear 110 to the gear 37, thus rotating the container body 33 around the rotation axis X. The drive motor 115 and the drive gear 110 function as a driver to rotate the container body 33. A configuration and operations of the toner container 32Y are described in further detail later.

With reference to FIG. 3, a conveying screw 92 is disposed inside the toner conveying nozzle 91. As a motor 93 rotates the conveying screw 92, the conveying screw 92 conveys the toner flowing into the toner conveying nozzle 91 from an inlet in the toner container 32Y from the left to the right in FIG. 3. Thus, the toner is discharged through an outlet of the toner conveying nozzle 91 to the hopper 81. The hopper 81 is disposed below the outlet of the toner conveying nozzle 91 via a dropping path 82. The toner stored in the hopper 81 is conveyed to the developing device 5 downstream from the hopper 81 by a conveyor.

A conveying mechanism by the conveyor is described with reference to FIG. 3. A suction port 83 is disposed in the bottom of the hopper 81 and coupled to one end of the conveying tube 95. The conveying tube 95 is made of a flexible rubber material with low affinity for toner, and the other end of the conveying tube 95 is coupled to a developer pump 60 (i.e., a diaphragm pump). The developer pump 60 is coupled to the developing device 5Y via the sub-hopper 70 and the conveying tube 96. In the toner supply device 90 with such a configuration, the drive motor 115 as the driver rotates the container body 33 of the toner container 32Y to discharge the toner stored in the toner container 32Y to the outside of the toner container 32Y through the toner conveying nozzle 91. The toner discharged from the toner container 32Y falls through the dropping path 82 and is stored in the hopper 81. The developer pump 60 operates to suck the toner stored in the hopper 81 together with air from the suction port 83 and convey the toner from the developer pump 60 to the sub-hopper 70 through the conveying tube 95. The toner conveyed to and stored in the sub-hopper 70 is appropriately supplied into the developing device 5Y via the conveying tube 96. That is, the toner in the toner container 32Y is conveyed in the direction indicated by dashed arrows in FIG. 3. The conveyor is not limited to the above-described configuration, and for example, the toner stored in the hopper 81 may be conveyed directly to the developing device 5Y by a screw disposed in the hopper 81.

A toner sensor 86 is disposed near the suction port 83 and indirectly detects a state in which the toner contained in the toner container 32Y is depleted (i.e., toner end state) or a state in which the toner contained in the toner container 32Y is nearly depleted (i.e., toner near end state). The toner is discharged from the toner container 32Y based on a detection result of the toner sensor 86. For example, a piezoelectric sensor or a transmission optical sensor may be used as the toner sensor 86. The height of the detection surface of the toner sensor 86 is set so that the amount of toner (i.e., a deposition height) deposited above the suction port 83 is a target value. A drive timing and a drive duration of the drive motor 115 are controlled to rotationally drive the toner container 32Y (i.e., the container body 33) based on the detection result of the toner sensor 86. Specifically, when the toner sensor 86 detects that toner is not deposited on the detection surface of the toner sensor 86, the drive motor 115 is driven for a predetermined time. When the toner sensor 86 detects that toner is present on the detection surface, the drive motor 115 stops. If the toner sensor 86 continuously detects that toner does not exist at the detection surface even when the above-described control is performed repeatedly, a controller of the image forming apparatus determines that the toner stored in the toner container 32Y is depleted (i.e., toner end state) or a state that the toner contained in the toner container 32Y is nearly depleted (i.e., toner near end state).

Figure 4:
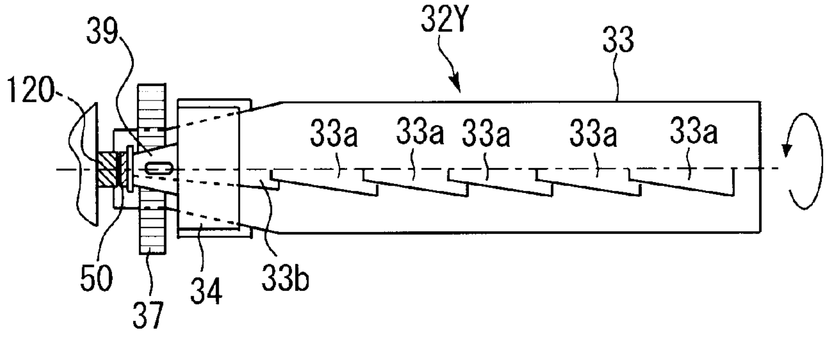
FIG. 4 is a view of a toner container.

With reference to FIGS. 4, 5A, 5B, and 6, a configuration and operations of the toner container 32Y in the present embodiment are described below. As described above with reference to FIG. 3, the toner container 32Y in the present embodiment is provided with the rotatable container body 33, a held portion 34 (serving as a cap), and the shutter 35. The opening portion 33*c* (serving as a toner discharge port) that discharges the toner in the container body 33 is formed on the first end in the rotation axis direction (i.e., left in FIGS. 4 and 5B) of the container body 33. The shutter 35 opens and closes the opening portion 33*c* of the container body 33 in conjunction with attachment of the toner container 32Y to the body of the image forming apparatus 100 (installation section 31) and detachment of the toner container 32Y from the body of the image forming apparatus 100 (installation section 31). That is, when the toner container 32Y is attached to the installation section 31, the shutter 35 that has closed the opening portion 33*c* moves so as to open the opening portion 33*c* in conjunction with the attaching operation. In contrast, when the toner container 32Y is removed from the installation section 31, the shutter 35 that has opened the opening portion 33*c* moves so as to close the opening portion 33*c* in conjunction with the removal operation. As illustrated in FIG. 4, the held portion 34 is disposed so as to cover the first end (left in FIG. 4) in the rotation axis direction of the container body 33 and is held by the installation section 31 (see FIG. 3) of the body of the image forming apparatus 100 so as not to rotate. In other words, the held portion 34 is rotatable relative to the container body 33. With reference to FIG. 4, the container body 33 includes the gear 37 that is rotatable together with the container body 33 on an outer circumferential surface on the first end in the rotation axis direction (i.e., left in FIG. 4). When the toner container 32Y is attached to the installation section 31, the gear 37 of the container body 33 meshes with the drive gear 110 of the body of the image forming apparatus 100. Thus, the container body 33 is rotationally driven.

With reference to FIG. 4, the toner container 32Y includes a holder 39 to hold an identification (ID) chip 50 as a data storage device. The ID chip 50 (serving as an information storage device) exchanges various kinds of data with a controller in the body of the image forming apparatus 100. Specifically, the ID chip 50 stores in advance data such as a manufacturing date, a manufacturing lot number, a color, a type of the toner stored in the toner container 32Y and data such as a manufacturing date, a destination, a manufacturing factory, and presence or absence of recycling of the toner container 32Y. When the toner container 32Y is attached to the installation section 31, as illustrated in FIG. 4, the ID chip 50 contacts a reading and writing device 120 of the body of the image forming apparatus 100 so as to be able to communicate with the reading and writing device 120. The data stored in the ID chip 50 is read by the reading and writing device 120 and sent to the controller. The data such as usage history of the image forming apparatus 100 is also sent from the controller of the body of the image forming apparatus 100 to the ID chip 50 via the reading and writing device 120, and the data is appropriately stored in the ID chip 50. The holder 39 that holds the ID chip 50 is held by the held portion 34 (serving as the cap).

With reference to FIGS. 4, 5A, 5B, and 6, in the toner container 32Y according to the present embodiment, the container body 33 has a plurality of projections 33*a* (groove portions) in the rotation axis direction (in the left and right direction in FIGS. 4 and 5B, and the direction perpendicular to the plane of FIGS. 5A and 6) on the inner circumferential surface of the container body 33. The projection 33*a* protrudes inward (toward the rotation axis X) of the container body 33 and has a slope K1 inclined with respect to the rotation axis direction. The slope K1 is inclined upward from the right to the left in FIG. 5B and generates a force that conveys toner in the container body 33 to the opening portion 33*c* in conjunction with rotation of the container body 33. When the container body 33 rotates in a predetermined direction (i.e., direction indicated by arrow in FIG. 6), the toner stored in the container body 33 is conveyed from a second end of the container body 33 in the rotation axis direction (i.e., a right end in FIGS. 4 and 5B) to the first end of the container body 33 in the rotation axis direction (i.e., a left end in FIGS. 4 and 5B) by the plurality of projections 33*a* having such a configuration as described above.

Figure 5A:
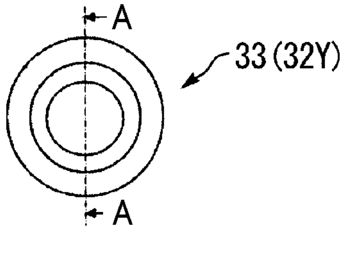
FIG. 5A is a front view of a container body of a toner container.
Figure 5B:
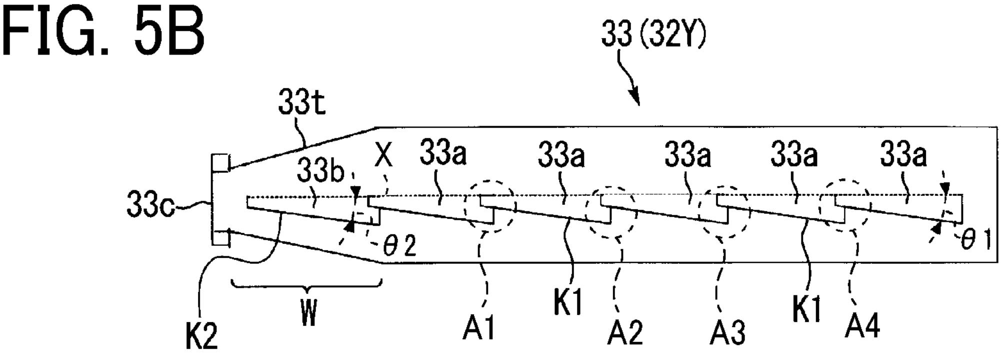
FIG. 5B is an A-A cross-sectional view illustrating the container body of the toner container.
Figure 6:
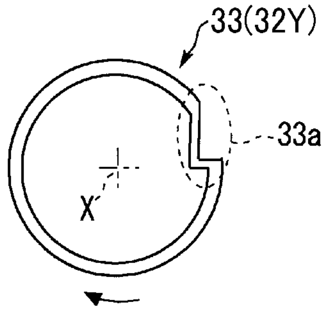
FIG. 6 is a cross-sectional view of a main part of the container body of the toner container.

In particular, in the present embodiment, as illustrated in FIGS. 5B and 6, the plurality of projections 33*a* are disposed at substantially the same position in the rotation direction when viewed in a cross section orthogonal to the rotation axis direction. In the present embodiment, the projection 33*a* is formed in a groove shape so as to protrude inward from the outer circumferential surface of the container body 33. In the present embodiment, the five projections 33*a* are disposed in a portion excluding a conical portion 33*t* of the container body 33 (a mortar-shaped area W near the opening portion 33*c*, see FIG. 5B). In addition to the five projections 33*a* (serving as first projections), a second projection 33*b* is formed in the vicinity of the opening portion 33*c* in the container body 33 in the present embodiment, which is described in detail later.

In the present embodiment, the plurality of projections 33*a* are disposed such that, out of two adjacent projections 33*a* in the rotation axis direction, one projection 33*a* closer to the first end of the container body 33 in the rotation axis direction overlaps the other projection 33*a* closer to the second end of the container body 33 in the rotation axis direction, in an area of the one projection 33*a* closer to the second end and an area of the other projection 33*a* closer to the first end in the rotation axis direction. That is, as illustrated in FIG. 5B, adjacent two projections 33*a* of the five projections 33*a* are disposed to overlap in any one of areas A1 to A4 surrounded by dashed lines.

Specifically, with reference to FIG. 5B, among the five projections 33*a*, the first projection 33*a* located on the leftmost (i.e., closest to the first end of the container body 33 in the rotation axis direction) overlaps the second projection 33*a* located on the right of (adjacent to) the first projection 33*a* in the area A1 surrounded by dashed line that includes a portion of the first projection 33*a* closer to the second end and a portion of the second projection 33*a* closer to the first end. The second projection 33*a* closer to the second end of the container body 33 overlaps the third projection 33*a* located on the right of (adjacent to) the second projection 33*a* in the area A2 surrounded by dashed line that includes a portion of the second projection 33*a* closer to the second end and a portion of the third projection 33*a* closer to the first end. The third projection 33*a* closer to the second end of the container body 33 overlaps the fourth projection 33*a* located on the right of (adjacent to) the third projection 33*a* in the area A3 surrounded by dashed line that includes a portion of the third projection 33*a* closer to the second end and a portion of the fourth projection 33*a* closer to the first end. The fourth projection 33*a* closer to the second end of the container body 33 overlaps the fifth projection 33*a* located on the rightmost (i.e., closest to the second end of the container body 33 in the rotation axis direction) in the area A4 surrounded by dashed line that includes a portion of the fourth projection 33*a* closer to the second end and a portion of the fifth projection 33*a* closer to the first end.

In this specification, "two projections adjacent to each other in the rotation axis direction" are defined as one projection having one slope and the other projection having another slope located at a position shifted in the rotation axis direction and closest to the one slope. Accordingly, as illustrated in FIG. 5B, two projections 33*a* disposed so that portions (the areas A1 to A4 surrounded by dashed lines) overlap each other, and two projections 33*a*1 and 33*a*2 in FIG. 7C described later are also "two projections adjacent to each other in the rotation axis direction". Further, in this specification, a state in which "out of two adjacent projections in the rotation axis direction, one projection closer to the first end in the rotation axis direction overlaps the other projection closer to the second end in the rotation axis direction, in an area of the one projection closer to the second end and an area of the other projection closer to the first end in the rotation axis direction" is defined as a state in which two projections are disposed at positions shifted (or positions completely overlapping each other) in the rotation axis direction (a state in which two projections partially (or entirely) overlap each other without being completely separated from each other). Accordingly, as illustrated in FIG. 5B, not only a case in which two adjacent projections 33*a* overlap each other in a short area in the rotation axis direction, but also a case in which two adjacent projections 33*a* overlap each other in a long area (more than half of the length of the projection 33*a* in the rotation axis direction) are included in the state in which "out of two adjacent projections in the rotation axis direction, one projection closer to the first end in the rotation axis direction overlaps the other projection closer to the second end in the rotation axis direction, in an area of the one projection closer to the second end and an area of the other projection closer to the first end in the rotation axis direction".

Figure 7:
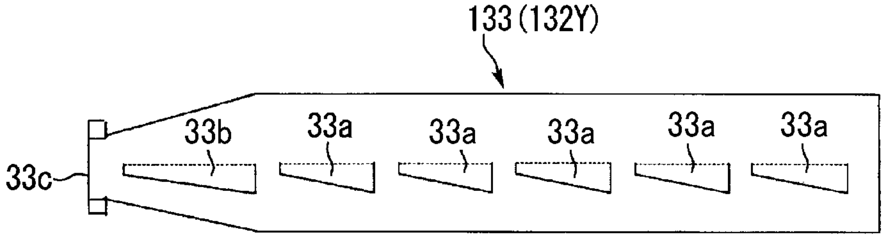
FIG. 7 is a cross-sectional view of the container body of the toner container as a comparative example.

As described above, the plurality of projections 33*a* on the toner container 32Y are not disposed with gaps between adjacent projections 33*a* (see the toner container 132Y as a comparative example illustrated in FIG. 7) but are disposed such that ends of adjacent projections overlap each other without gaps. Accordingly, the toner capacity that can be stored does not decrease, and a disadvantage that a larger amount of toner remains at the toner end state is less likely to occur. For example, in a conventional toner container in which a spiral groove (projection) is provided on the circumferential surface of the container body, the internal volume of the container body is reduced by an amount of the groove, and the toner capacity that can be stored is reduced. In contrast, in the present embodiment, a spiral groove is not formed in the entire area in the rotation direction of the container body 33, but a plurality of projections 33*a* (groove portions) are formed only in a part in the rotation direction of the container body 33. Thus, the percentage of the projection protruding inward of the container body 33 is decreased. The toner capacity that can be stored increases compared to a case of forming a spiral groove for the container body having the same inner diameter. As in the toner container 132Y as a comparative example illustrated in FIG. 7, in a case where the plurality of projections 33*a* of the container body 133 are disposed such that adjacent projections 33*a* are disposed with gaps each other, toner is likely to accumulate between the adjacent projections 33*a*. Accordingly, the toner remaining in the container body 33 at the toner end state increases. Thus, the toner container 32Y needs to be replaced in a state where the toner remains wastefully. In contrast, in the present embodiment, since the plurality of projections 33*a* of the container body 133 are disposed such that adjacent projections 33*a* are disposed without gaps each other, the above-described problem is less likely to occur.

In the present embodiment, the container body 33 includes the second projection 33*b* at a position shifted from the opening portion 33*c* toward the second end in the rotation axis direction. The second projection 33*b* is disposed on an inner circumferential surface (i.e., an inner circumferential surface in the area W in FIG. 5B) at a position shifted from the plurality of projections 33*a* (serving as first projections) toward the first end of the container body 33 in the rotation axis direction. The second projection 33*b* has a slope K2 protruding inward and inclined at an angle θ2 smaller than an angle θ1 of the slope K1 of the projection 33*a* (serving as the first projection) with respect to the rotation axis direction. The second projection 33*b* conveys the toner conveyed in the rotation axis direction by the plurality of first projections 33*a* while scooping up the toner toward the opening portion 33*c*. Since the inclination angle θ2 of the slope K2 of the second projection 33*b* is small, a conveyance force in the rotation axis direction is reduced, thus facilitating a toner scooping force to act on the toner.

In the present embodiment, the container body 33 is formed such that the inner diameter of the inner circumferential surface gradually decreases from a position closer to the first end in the rotation axis direction than the plurality of projections 33*a* (first projection), to the opening portion 33*c* (the area W in FIG. 5B). Specifically, the container body 33 is formed such that a portion other than the area W (the portion where the first projections 33*a* are provided) has substantially the same diameters. The mortar-shaped conical portion 33*t* is formed in the area W. By providing the conical portion 33*t* in this manner, the toner conveyed in the rotation axis direction by the plurality of first projections 33*a* is smoothly scooped up toward the opening portion 33*c* and is smoothly discharged from the opening portion 33*c* to the outside.

In particular, in the present embodiment, since the second projection 33*b* is provided on the conical portion 33*t*, smooth scooping of toner toward the opening portion 33*c* and smooth discharge of toner from the opening portion 33*c* to the outside are expedited. In the present embodiment, the first projection 33*a* adjacent to the second projection 33*b* among the five first projections 33*a* is disposed such that an area of the first projection 33*a* closer to the first end of the container body 33 in the rotation axis direction and an area of the second projection 33*b* closer to the second end of the container body 33 in the rotation axis direction overlap each other. As a result, a problem that toner accumulates between the first projection 33*a* and the second projection 33*b* is less likely to occur.

Modification

Figure 8A:
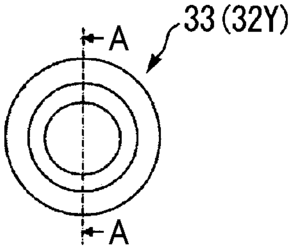
FIG. 8A is a front view of a container body of a toner container as a modification.
Figure 8B:
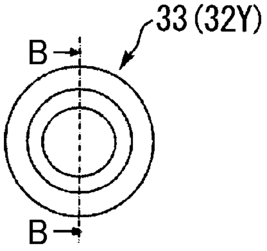
FIG. 8B is another front view of the container body of the toner container as the modification.
Figure 8C:
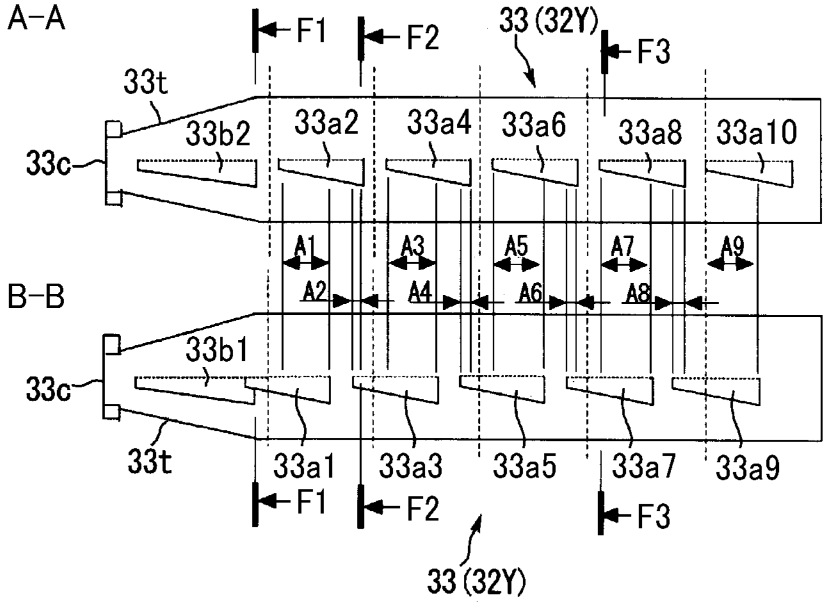
FIG. 8C is an A-A cross-sectional view of the container body of the toner container in FIG. 8A and a B-B cross-sectional view of the container body of the toner container in FIG. 8B arranged in the same direction.
Figure 9:
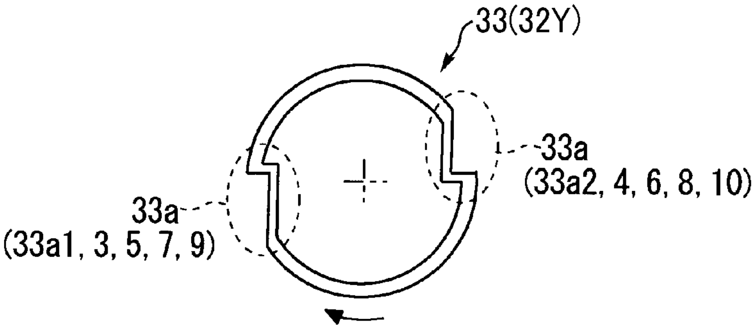
FIG. 9 is a cross-sectional view of a main part of the container body of the toner container in FIG. 8.
Figure 10A:
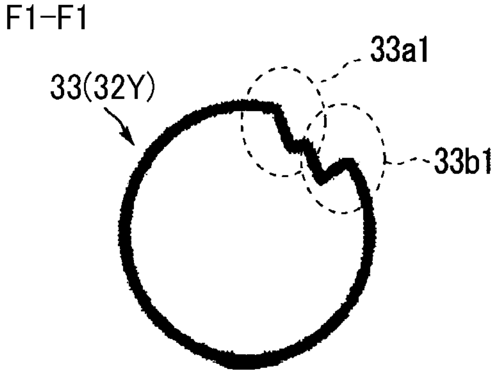
FIG. 10A is an F1-F1 cross-sectional view of the toner container in FIG. 8C.
Figure 10B:
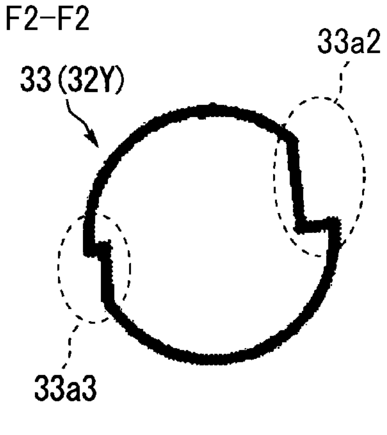
FIG. 10B is an F2-F2 cross-sectional view of the toner container in FIG. 8C.
Figure 10C:
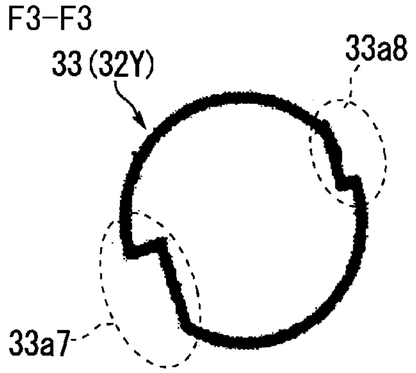
FIG. 10C is an F3-F3 cross-sectional view of the toner container in FIG. 8C.

As illustrated in FIGS. 8A, 8B, 8C, 9, 10A, 10B and 10C, a plurality of projections 33*a*1 to 33*a*10 (serving as first projections) of the toner container 32Y (or the container body 33) in the modification are disposed such that two projections 33*a* adjacent to each other in the rotation axis direction are disposed at different positions in a rotation direction of the container body 33 when viewed in a cross section orthogonal to in the rotation axis direction. In the present embodiment, the positions are shifted by approximately 180 degrees in the direction of rotation about the rotation axis X of the container body 33 when viewed in a cross section orthogonal to the rotation axis direction. Further, in the modification, two second projections 33*b*1 and 33*b*2 are provided at different positions in the rotation direction. Specifically, the five first projections 33*a*1, 33*a*3, 33*a*5, 33*a*7, and 33*a*9 are disposed side by side in the rotation axis direction with gaps therebetween in a part of the rotation direction of the container body 33 (at positions corresponding to the A-A cross section), and the second projection 33*b*1 is disposed in the vicinity of the opening portion 33*c*. The five first projections 33*a*2, 33*a*4, 33*a*6, 33*a*8, and 33*a*10 are disposed side by side in the rotation axis direction with gaps therebetween in another part (at positions corresponding to the B-B cross section) different from the part in the rotation direction of the container body 33, and the second projection 33*b*2 is disposed in the vicinity of the opening portion 33*c*. As illustrated in FIG. 8C, the total of ten projections 33*a*1 to 33*a*10 are alternately disposed at positions corresponding to the A-A cross section and positions corresponding to the B-B cross section when the projections arranged at the positions corresponding to the A-A cross section and the projections arranged at the positions corresponding to the B-B cross section are overlapped. That is, the projections 33*a*1, 33*a*2, 33*a*3, 33*a*4, 33*a*5, 33*a*6, 33*a*7, 33*a*8, 33*a*9, and 33*a*10 are arranged in this order in the rotation axis direction. Also in the modification, the two projections among the ten projections 33*a*1 to 33*a*10 are disposed such that an area of the first projection closer to the first end of the container body in the rotation axis direction and an area of the second projection closer to the second end of the container body in the rotation axis direction overlap each other. Specifically, the two projections 33*a*1 and 33*a*2 adjacent to each other in the rotation axis direction are disposed such that end portions thereof overlap with each other in an area A1 without a gap therebetween in the rotation axis direction. The two projections 33*a*2 and 33*a*3 adjacent to each other in the rotation axis direction have substantially the same configuration. Two projections 33*a*3 and 33*a*4, two projections 33*a*4 and 33*a*5, two projections 33*a*5 and 33*a*6, two projections 33*a*6 and 33*a*7, two projections 33*a*7 and 33*a*8, two projections 33*a*8 and 33*a*9, two projections 33*a*9 and 33*a*10 also overlap with each other in the areas A2 to A9. More specifically, with reference to FIG. 10A, a cross section (F1-F1 cross section) of a portion where the first projection 33*a*1 and the second projection 33*b*1 overlap each other in the container body 33 is formed in a stepped manner. Further, with reference to FIGS. 10B and 10C, a cross section of a portion where the first projections 33*a*3 and 33*a*7 (33*a*1, 33*a*5, and 33*a*9) arranged at the positions corresponding to the A-A cross section and the first projections 33*a*2 and 33*a*8 (33*a*4, 33*a*6, and 33*a*10) arranged at the positions corresponding to the B-B cross section overlap has a portion with different depths (size) of projections. In the modification with such a configuration, toner is less likely to accumulate between the two projections adjacent to each other in the rotation axis direction of the ten projections 33*a*1 to 33*a*10. That is, when viewed in the rotation axis direction, an area in which toner stagnates due to lowering of the toner conveyance performance is less likely to occur. As a result, also in the modification, a problem that the storageable toner capacity decreases and the toner remaining at the toner end state increases is less likely to occur.

As described above, the toner container 32Y according to the present embodiment includes the rotatable container body 33. The container body 33 includes the opening portion 33*c* and the plurality of projections 33*a*. The opening portion 33*c* is disposed on the first end of the container body 33 in the rotation axis direction. Each of the plurality of projections 33*a* has the slope K1 protruding inward and inclined in the rotation axis direction. The plurality of projections 33*a* are disposed in the rotation axis direction on the inner circumferential surface of the container body 33. The plurality of projections 33*a* are disposed such that, out of two adjacent projections 33*a* in the rotation axis direction, an area of the first projection 33*a* closer to the first end of the container body 33 in the rotation axis direction and an area of the second projection 33*b* closer to the second end of the container body 33 in the rotation axis direction overlap each other. As a result, a problem that the storageable toner capacity decreases and the remaining amount of toner at the toner end state increases is less likely to occur.

In the present embodiment, the toner container 32Y stores toner (serving as a one-component developer) but is not limited to this. For example, in some embodiments, a toner container may store a two-component developer containing toner and carrier. Even such a case exhibits substantially the same advantages as the advantages of the above-described embodiments.

The above-described embodiments are illustrative and do not limit the present disclosure. Thus, numerous additional modifications and variations are possible in light of the above teachings. It is therefore to be understood that within the scope of the present disclosure, the present disclosure may be practiced otherwise than as specifically described herein. The number, position, and shape of the components described above are not limited to those embodiments described above. Desirable number, position, and shape can be determined to perform the present disclosure.

REFERENCE SIGNS LIST

- 5Y Developing device (supplied unit)
- 32Y, 32M, 32C, 32K Toner containers (powder containers)
- 33 Container body
- 33*a*, 33*a*1 to 33*a*10 Projections (first projections)
- 33*b* Second projection
- 33*t* Conical portion
- 34 Held portion (cap)
- 35 Shutter
- 37 Gear
- 39 Holding member
- 50 ID chip (information storage device)
- 100 Image forming apparatus
- 120 Reading and writing device
- K1, K2 Slopes

The invention claimed is:

1. A toner container comprising:

a rotatable container body, the container body including:

an opening portion at a first end, which is opposite a second end, in a rotation axis direction; and a plurality of projections on an inner circumferential surface of the container body, each protruding inwardly from an outer circumferential surface of the container body and having a slope inclined with respect to the rotation axis direction, wherein the plurality of projections are disposed such that, out of two adjacent projections in the rotation axis direction, one projection of the two adjacent projections that is closer to the first end of the container body in the rotation axis direction overlaps the other projection of the two adjacent projections that is closer to the second end of the container body in the rotation axis direction, in an area of an end of the one projection closer to the second end and an area of an end of the other projection closer to the first end in the rotation axis direction, and wherein each of the plurality of projections have a concave shape from the outer circumferential surface toward the inner circumferential surface of the container body,. and ends of the plurality of projections overlap each other without gaps.

2. The toner container according to claim 1, wherein the plurality of projections are disposed at the same positions when viewed in a cross section orthogonal to the rotation axis direction.

3. The toner container according to claim 2, wherein the two adjacent projections are directly adjacent to each other.

4. The toner container according to claim 1, wherein the plurality of projections are disposed such that two adjacent projections in the rotation axis direction are disposed at different positions in a direction of rotation of the container body when viewed in a cross section orthogonal to the rotation axis direction.

5. The toner container according to claim 4, wherein the different positions are shifted by 180 degrees in the direction of rotation about a rotation axis of the container body when viewed in the cross section orthogonal to the rotation axis direction.

6. The toner container according to claim 5, wherein the two adjacent projections are directly adjacent to each other.

7. The toner container according to claim 4, wherein the two adjacent projections are directly adjacent to each other.

8. The toner container according to claim 1, wherein the plurality of projections are to convey toner stored in the container body from the second end to the first end in the rotation axis direction as the container body rotates in a predetermined direction.

9. The toner container according to claim 8, wherein the two adjacent projections are directly adjacent to each other.

10. The toner container according to claim 1, wherein the container body further includes another projection at a position shifted from the opening portion toward the second end in the rotation axis direction and on an inner circumferential surface at a position shifted from the plurality of projections to the first end of the container body in the rotation axis direction, and wherein said another projection has a slope protruding inward and inclined at an angle smaller than an angle of the slope of each of the plurality of projections with respect to the rotation axis direction.

11. The toner container according to claim 10, wherein the container body further includes still another projection at a position shifted from the opening portion toward the second end in the rotation axis direction and on the inner circumferential surface at a position shifted from the plurality of projections to the first end of the container body in the rotation axis direction, wherein said still another projection has a slope protruding inward and inclined at a same angle as the angle of the slope of said another projection with respect to the rotation axis direction, and wherein said another projection and said still another projection are disposed at different positions in the direction of rotation.

12. The toner container according to claim 11, wherein the two adjacent projections are directly adjacent to each other.

13. The toner container according to claim 10, wherein the two adjacent projections are directly adjacent to each other.

14. The toner container according to claim 1, wherein an inner diameter of an inner circumferential surface of the container body gradually decreases from a position closer to the first end in the rotation axis direction than the plurality of projections, to the opening portion.

15. The toner container according to claim 14, wherein the two adjacent projections are directly adjacent to each other.

16. The toner container according to claim 1, further comprising:

a cap to be held non-rotatably at a body of an image forming apparatus;

a holder to hold a memory and to be held at the cap;

a shutter to open and close the opening portion in conjunction with attachment and detachment of the toner container with respect to the body of the image forming apparatus; and a gear on the outer circumferential surface of the container body at the first end in the axis direction, the gear being rotatable together with the container body.

17. The toner container according to claim 16, wherein the two adjacent projections are directly adjacent to each other.

18. An image forming apparatus comprising:

a body; and the toner container according to claim 1 detachably attached to the body.

19. The toner container according to claim 1, wherein the two adjacent projections are directly adjacent to each other.

* * * * *